(12) United States Patent
Tiana et al.

(10) Patent No.: US 11,880,034 B2
(45) Date of Patent: *Jan. 23, 2024

(54) HIGH ASSURANCE HEAD TRACKING SYSTEM INCORPORATING GROUND TRUTH FIDUCIALS

(71) Applicant: Rockwell Collins, Inc., Cedar Rapids, IA (US)

(72) Inventors: Carlo L. Tiana, Portland, OR (US); Brandon E. Wilson, Portland, OR (US); Alexander D. Reid, Tualatin, OR (US); David I. Han, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,793

(22) Filed: Apr. 29, 2022

(65) Prior Publication Data

US 2022/0252876 A1 Aug. 11, 2022

Related U.S. Application Data

(63) Continuation of application No. 16/923,848, filed on Jul. 8, 2020, now Pat. No. 11,320,650, and a (Continued)

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0101* (2013.01); *G02B 27/0172* (2013.01);
(Continued)

(58) Field of Classification Search
CPC ............ G02B 27/0093; G02B 27/0101; G02B 27/0172; G02B 2027/0138; G06T 7/74; G06T 2207/30244; G06F 3/012
See application file for complete search history.

(56) References Cited

U.S. PATENT DOCUMENTS

| 5,645,077 A | 7/1997 | Foxlin |
| 5,812,257 A | 9/1998 | Teitel et al. |

(Continued)

OTHER PUBLICATIONS

Costi, Stephen Matthew et al., "Mobile Motion Capture", Worchester Polytechnic Institute Digital WPI, Dec. 2014m https://digitalcommons.wpi.edu/mqp-all, 94 pages.
(Continued)

*Primary Examiner* — Afroza Chowdhury
(74) *Attorney, Agent, or Firm* — Suiter Swantz pc llo

(57) ABSTRACT

A high-assurance headtracking system for a head worn display (HWD) incorporating ground-truth fiducials is disclosed. In embodiments, the headtracking system includes a camera fixed to a mobile platform (e.g., an aircraft cockpit) and oriented toward a pilot wearing the HWD. Images captured by the camera detect fiducial markers attached to the HWD (and fixed in a device reference frame) and static fiducial markers fixed to the mobile platform, each static fiducial marker including a constellation of individual markers having a known position and orientation in the platform reference frame. The headtracking system include control processors for analyzing the images and identifying therein the device-frame and static fiducial markers. The headtracking system determines a device pose of the HWD relative to the platform reference frame and monitors the device pose for drift or error based on the known positions of the identified static fiducial markers.

17 Claims, 6 Drawing Sheets

Related U.S. Application Data continuation-in-part of application No. 16/890,919, filed on Jun. 2, 2020, now Pat. No. 11,360,552.

(51) Int. Cl.
*G06T 7/73* (2017.01)
*G06F 3/01* (2006.01)

(52) U.S. Cl.
CPC ............... *G06F 3/012* (2013.01); *G06T 7/74* (2017.01); *G02B 2027/0138* (2013.01); *G06T 2207/30244* (2013.01)

(56) References Cited

U.S. PATENT DOCUMENTS

| | | | |
|---|---|---|---|
| 6,049,747 A | 4/2000 | Nakajima et al. | |
| 6,162,191 A | 12/2000 | Foxlin | |
| 6,176,837 B1 | 1/2001 | Foxlin | |
| 6,311,129 B1 | 10/2001 | Lin | |
| 6,361,507 B1 | 3/2002 | Foxlin | |
| 6,377,401 B1 | 4/2002 | Bartlett | |
| 6,408,245 B1 | 6/2002 | An et al. | |
| 6,409,687 B1 | 6/2002 | Foxlin | |
| 6,449,559 B2 | 9/2002 | Lin | |
| 6,474,159 B1 | 11/2002 | Foxlin et al. | |
| 6,480,152 B2 | 11/2002 | Lin et al. | |
| 6,658,354 B2 | 12/2003 | Lin | |
| 6,681,629 B2 | 1/2004 | Foxlin et al. | |
| 6,738,714 B2 | 5/2004 | McCall et al. | |
| 6,786,877 B2 | 9/2004 | Foxlin | |
| 6,820,025 B2 | 11/2004 | Bachmann et al. | |
| 7,000,469 B2 | 2/2006 | Foxlin et al. | |
| 7,046,215 B1 | 5/2006 | Bartlett | |
| 7,266,446 B1 | 9/2007 | Pelosi | |
| 7,301,648 B2 | 11/2007 | Foxlin | |
| 7,395,181 B2 | 7/2008 | Foxlin | |
| 7,409,290 B2 | 8/2008 | Lin | |
| 7,640,106 B1 | 12/2009 | Stokar et al. | |
| 7,672,781 B2 | 3/2010 | Churchill et al. | |
| 8,019,538 B2 | 9/2011 | Soehren et al. | |
| 8,165,844 B2 | 4/2012 | Uinge et al. | |
| 8,953,154 B2 | 2/2015 | Galea et al. | |
| 8,965,736 B2 | 2/2015 | Horton et al. | |
| 9,766,075 B2 | 9/2017 | Foxlin | |
| 9,891,705 B1 | 2/2018 | Lahr et al. | |
| 10,068,049 B2 | 9/2018 | Gibbs et al. | |
| 10,216,265 B1 | 2/2019 | Kirchner et al. | |
| 10,775,881 B1 | 9/2020 | Lahr et al. | |
| 11,320,650 B1* | 5/2022 | Tiana | G02B 27/0101 |
| 11,360,552 B1* | 6/2022 | Tiana | G06V 40/166 |
| 2008/0218434 A1 | 9/2008 | Kelly et al. | |
| 2010/0109976 A1 | 5/2010 | Gilbert et al. | |
| 2019/0041979 A1 | 2/2019 | Kirchner et al. | |

OTHER PUBLICATIONS

Ercan, Munir, (2010). A 3D Topological Tracking System for Augmented Reality [Unpublished Master's Thesis] Middle East Technical University.

Foxlin, Eric et al., "FlightTracker: A Novel Optical/Inerital Tracker for Cockpit Enhanced Vision", Proceedings of the Third IEEE and ACM International Symposium on Mixed and Augmented Reality, Nov. 2, 2004, 10 pages.

Hutson, Malcolm et al., (2011). JanusVF: Accurate navigation using SCAAT and virtual fiducials. Visualization and Computer Graphics, IEEE Transactions on. 17. 3-13. 10.1109/TVCG.2010.91.

Murphy Chutorian, Erik et al., "Head Pose Estimation and Augmented Reality Tracking: An Integrated System and Evaluation for Monitoring Driver Awareness", IEE Transactions on Intelligent Transportation Systems, vol. 11 No. 2, Jun. 2010, pp. 300-311.

Murphy-Chutorian, Erik et al., "Head Pose Estimation in Computer Vision: A Survey," in IEEE Transactions on Pattern Analysis and Machine Intelligence, vol. 31, No. 4, pp. 607-626, Apr. 2009, doi: 10.1109/TPAMI.2008.106.

Ross, D.A., et al., Incremental Learning for Robust Visual Tracking. Int J Comput Vis 77, 125-141 (2008). https://doi.org/10.1007/s11263-007-0075-7.

S. Jha, et al., "The Multimodal Driver Monitoring Database: A Naturalistic Corpus to Study Driver Attention," in IEEE Transactions on Intelligent Transportation Systems, doi: 10.1109/TITS.2021.3095462.

Shewell, C., et al., (2017). Indoor localisation through object detection within multiple environments utilising a single wearable camera. Health and technology, 7(1), 51-60. https://doi.org/10.1007/s12553-016-0159-x.

* cited by examiner though 1, as defined by claims appended hereto.

HIGH ASSURANCE HEAD TRACKING SYSTEM INCORPORATING GROUND TRUTH FIDUCIALS

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

Related Applications

U.S. patent application Ser. No. 16/890,919 filed Jun. 2, 2020 and entitled HIGH ASSURANCE HEADTRACKING VIA STRUCTURED LIGHT PROJECTION FOR HEAD WORN DISPLAY (HWD), of which the instant application is a continuation-in-part;

and U.S. patent application Ser. No. 16/923,848 filed Jul. 8, 2020 and entitled HIGH ASSURANCE HEAD TRACKING SYSTEM INCORPORATING GROUND TRUTH FIDUCIALS, which application issued May 3, 2022 as U.S. Pat. No. 11,320,560, of which the instant application is a continuation.

Said U.S. patent application Ser. Nos. 16/890,619 and 16/923,848 are herein incorporated by reference in their entirety.

TECHNICAL FIELD

The subject matter disclosed herein is directed generally to head-worn display (HWD) systems for aircraft pilots, and more particularly to alternative or backup systems for correcting drifting or misaligned headtracking systems.

BACKGROUND

Headtracking devices allow helmet-mounted or otherwise head-worn transparent display systems to provide pilots and crew of fightercraft or other aircraft with accurate enhanced vision (e.g., synthetic vision, augmented reality, mixed reality) by monitoring the position and orientation ("pose") of the pilot's head relative to the aircraft with high accuracy, such that conformal information displayed to the pilot at any moment aligns precisely with what the pilot would otherwise be seeing when looking in that direction at that moment. Head misalignment errors may lead to misalignment of conformal critical flight information (e.g., conformal information displayed discontiguous with its actual location), with potentially catastrophic consequences.

SUMMARY

A high-assurance headtracking system for a head worn display (HWD) incorporating ground-truth fiducials is disclosed. In embodiments, the headtracking system includes a camera fixed to a mobile platform (e.g., an aircraft cockpit) and oriented toward a pilot wearing the HWD. Images captured by the camera detect fiducial markers attached to the HWD (and fixed in a device reference frame) and static fiducial markers fixed to the mobile platform, each static fiducial marker including a constellation of individual markers having a known position and orientation in the platform reference frame. The headtracking system include control processors for analyzing the images and identifying therein the device-frame and static fiducial markers. The headtracking system determines a device pose of the HWD relative to the platform reference frame and monitors the device pose for drift or error based on the known positions of the identified static fiducial markers.

In some embodiments, the device-frame fiducial markers and the platform-frame static fiducial markers include reflective markers or constellations thereof.

In some embodiments, the headtracking system refines the determined device pose based on the known positions of identified static fiducial markers (e.g., if the static fiducial markers indicate drift or error on the part of the device pose).

In some embodiments, the device-frame fiducial markers and the platform-frame static fiducial markers include light-emitting diodes (LED) or constellations thereof.

In some embodiments, the constellations of LEDs include constellations of individually addressable or programmable LEDs.

In some embodiments, the constellations of LEDs include pulse-width modulated (PWM) LEDs programmable by the headtracking system, e.g., at various brightness levels.

In some embodiments, the device-frame fiducial markers and the platform-frame static fiducial markers correspond to sets of unique encoded identifiers (e.g., constellation data or binary encoding).

In embodiments, the headtracking system encodes each constellation of markers (e.g., the device-frame fiducial markers and the platform-frame static fiducial markers) according to the sets of unique identifiers.

In embodiments, the unique encoded identifiers correspond to an orientation, or to a spatial extent, of a particular device-frame or platform-frame static fiducial marker, or to a marker constellation or subconstellation thereof.

In some embodiments, the headtracker system monitors the fixed alignment of the camera relative to the platform reference frame (in which it is fixed) based on the position and orientation information of identified platform-frame static fiducial markers within images captured by the camera.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
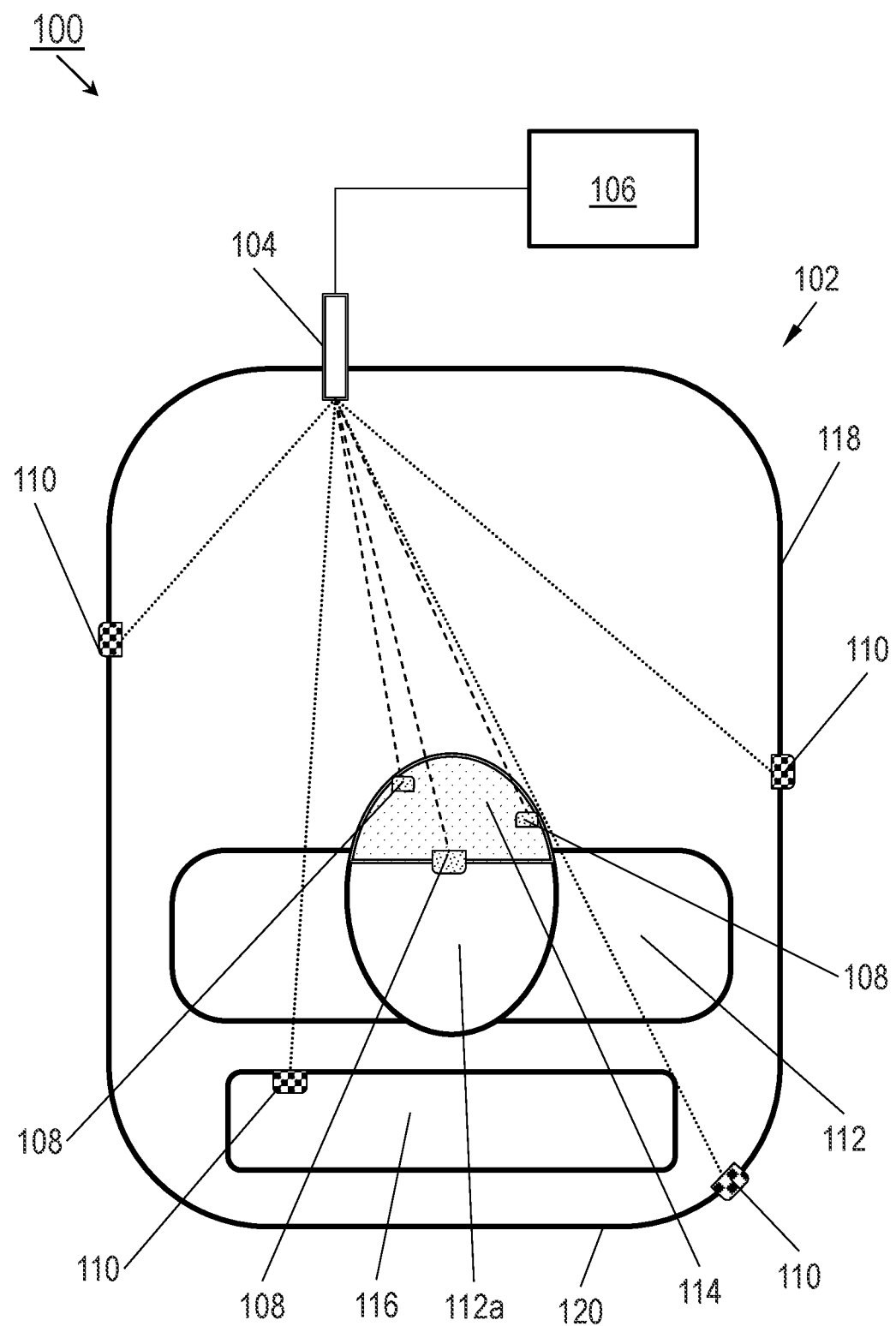
FIG. 1 is a diagrammatic overhead view of an outside-in headtracking system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, an outside-in headtracking system 100 is disclosed. The headtracking system 100 may be embodied in an aircraft cockpit 102 and may include a camera 104, control processors 106, device-frame fiducial markers 108, and platform-frame static fiducial markers 110.

In embodiments, the headtracking system 100 may determine and update a current head pose of the pilot 112 (e.g., operator of the mobile platform) and provide the updated head pose (e.g., position and orientation) information to display systems within the cockpit 102 (e.g., head-worn displays or helmet-mounted displays 114 (HWD, HMD)) to ensure that visual intelligence presented by the HWD 114 is consistent with the position and orientation of the head 112a of the pilot at any given moment. For example, the HWD 114 may be a component of a "glass cockpit" system that provides real-time conformal flight information for the environment around the aircraft in all directions; the visual intelligence may further be augmented by enhanced-vision or synthetic-vision systems that identify any proximate aircraft, current or potential threats, natural or manmade landmarks, terrain and infrastructure to the pilot (e.g., operator). Any misalignment of conformal flight information, no matter how slight, may have deleterious (e.g., minor, major, hazardous, catastrophic) outcomes.

In embodiments, the cockpit 102 may be associated with a platform reference frame (e.g., relative to the mobile platform, or the aircraft). The platform reference frame may continually change as the aircraft travels inflight (e.g., translating and/or rotating relative to the earth frame), but the camera 104, and any other component fixed to the cockpit 102 (e.g., the pilot's seat 116), may throughout remain in a fixed position and orientation relative to the platform reference frame.

In embodiments, the pilot 112 may be seated within the cockpit 102 and may remain there throughout a flight. However, the reference frame relative to the pilot 112 (in particular the device reference frame relative to the HWD 114, worn on and moving in unison with the head 112a), may continually change relative to the platform reference frame as the pilot 112 and/or the pilot's head 112a move around within the cockpit 102. For example, the pilot 112 may translate along at least three axes (e.g., forward/backward, left/right/up/down) relative to the cockpit 102 and any components fixed therein (including the camera 104) and therefore relative to the platform reference frame. Similarly, the pilot's head 112a may rotate relative to its own x-, y-, and z-axes. As a result of these translations and rotations, the position and orientation of the head 112a (and therefore the precise direction in which the pilot is looking) may continually change relative to the platform reference frame.

In embodiments, the headtracker system 100 may track the current device pose (e.g., position and orientation) of the HWD 114 relative to the platform reference frame via the camera 104 and device-frame fiducial markers 108. For example, the camera 104 may be fixed in the cockpit and oriented toward the pilot 112, and therefore toward the head 112a and HWD 114. The device-frame fiducial markers 108 may be fixed to the HWD 114; accordingly, the camera 104 may capture a continuous stream of images within which the HWD 114 and one or more of the device-frame fiducial markers 108 may be detected. Accordingly, by identifying within the captured images the device-frame fiducial markers 108, and determining a current device pose (e.g., position and orientation) of each identified device-frame fiducial marker relative to the platform reference frame, the headtracker system 100 may determine a current device pose of the HWD 114. In embodiments, the device-frame fiducial markers 108 and the platform-frame static fiducial markers 110 may incorporate any appropriate means of encoding data that uniquely identifies the encoded marker and distinguishes the marker from other such encoded markers detectable by the headtracker system 100 including, but not limited to, ArUco markers, backlights, stickers, or any other appropriate types of binary or encoded markers detectable by the camera 104 and distinguishable from each other.

Figure 2A:
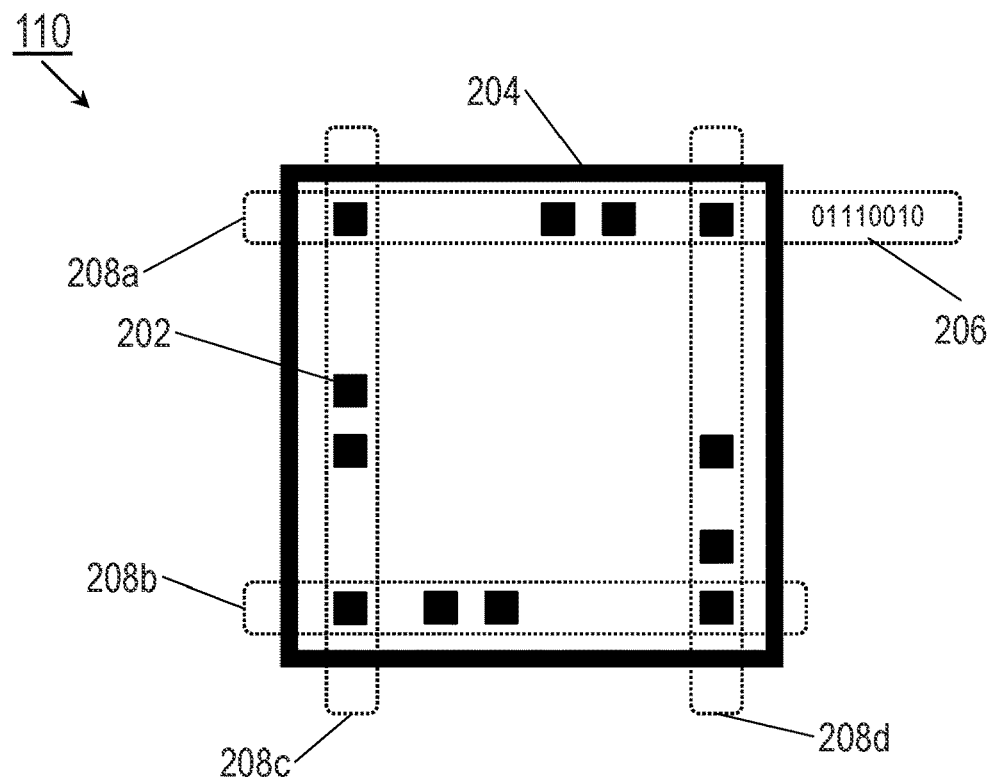
FIGS. 2A and 2B are diagrammatic illustrations of fiducial markers of the headtracking system of FIG. 1.

Referring to FIG. 2A, a platform-frame static fiducial marker 110 is disclosed.

In embodiments, the headtracker system 100 of FIG. 1 may include platform-frame static fiducial markers 110 fixed to the interior of the cockpit (102, FIG. 1). For example, each platform-frame static fiducial marker 110 may be "static" in the sense that its location and orientation relative to the platform reference frame is unchanging and known to the headtracker system 100. The platform-frame static fiducial marker 110 may be shown in an origin pose, e.g., wherein the reference frame of the viewer is precisely aligned at a fixed, known distance and at a head-on orientation relative to the platform reference frame to which the platform-frame static fiducial marker is attached. Platform-frame static fiducial markers 110 may be mounted to any interior surface of the cockpit 102 within the field of view of the camera (104, FIG. 1); e.g., on sidewalls (118, FIG. 1); mounted on the pilot's seat (116, FIG. 1); on rear walls (120, FIG. 1). In embodiments, the platform-frame static fiducial markers 110 may be utilized to verify device pose data determined by the headtracker system 100 or calibrate the camera 104.

For example, the platform-frame static fiducial markers 110 (or, e.g., the device-frame fiducial markers 108a-c, FIG. 1) may correspond to specific encoded information detectable by the camera 104, e.g., an ArUco-type marker including a border and an inner M×M binary matrix (where M is an integer) defining an $M^2$-bit binary code represented by black bits (e.g., pixels) and white bits and uniquely identifying the platform-frame static fiducial marker. The border may convey to the camera 104 the current orientation of the platform-frame static fiducial marker 110 (e.g., as rotated and/or translated from a known origin) while the black bits and white bits may uniquely identify a particular platform-frame static fiducial marker 110 according to its inner binary matrix.

By way of a non-limiting example, the platform-frame static fiducial marker 110 may comprise a constellation of dots 202 (e.g., marker elements) within a border 204. In embodiments, the constellation of dots 202 may be interpreted by the camera 104 (e.g., or by control processors (106, FIG. 1) of the headtracking system 100) as binary values (206) or other like forms of encoded information. For example, a row of dots 202 may comprise a sub-constellation 208a (e.g., a line), the platform-frame static fiducial marker 110 comprising an arrangement of several such sub-constellations (208a-d), each sub-constellation positioned and oriented relative to the other sub-constellations and corresponding to distinct encoded information.

Figure 2B:
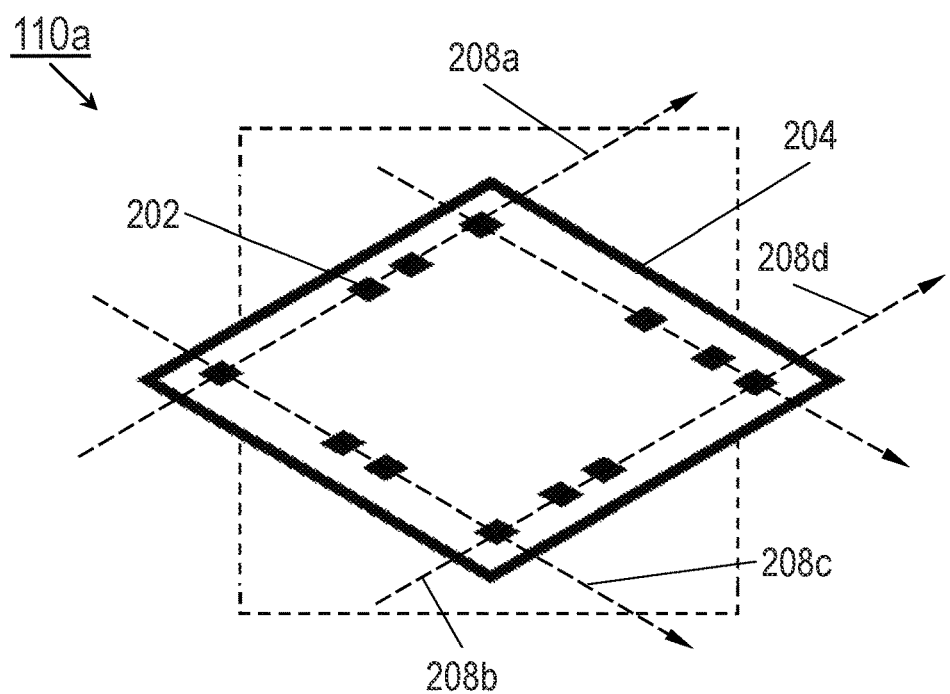

Referring now to FIG. 2B, the platform-frame static fiducial marker 110a may be implemented and may function similarly to the platform-frame static fiducial marker 110 of FIG. 2A, except that the platform-frame static fiducial marker 110a may be mounted (e.g., within the cockpit 102 and as seen by the camera 104) at a position and orientation shifted from the origin pose of the platform-frame static fiducial marker 110, but likewise known to the headtracker system 100. For example, the headtracker system 100 may identify the platform-frame static fiducial marker 110a within images of the cockpit 102 captured by the camera 104, e.g., by identifying the border 204 and its dimensions (e.g., spatial extent), identifying and decoding the dots 202 and sub-constellations 208a-d, and comparing the dimensions of the identified and decoded platform-frame static fiducial marker 110a with the known position and orientation of the platform-frame static fiducial marker 110 of FIG. 1 relative to the platform reference frame to confirm the identified platform-frame static fiducial marker 110a. Identified platform-frame static fiducial markers 110a within a captured image may be used as references for other objects identified within the captured image, e.g., the HWD 114 or device-frame fiducial markers 108-c attached thereto).

Figure 3:
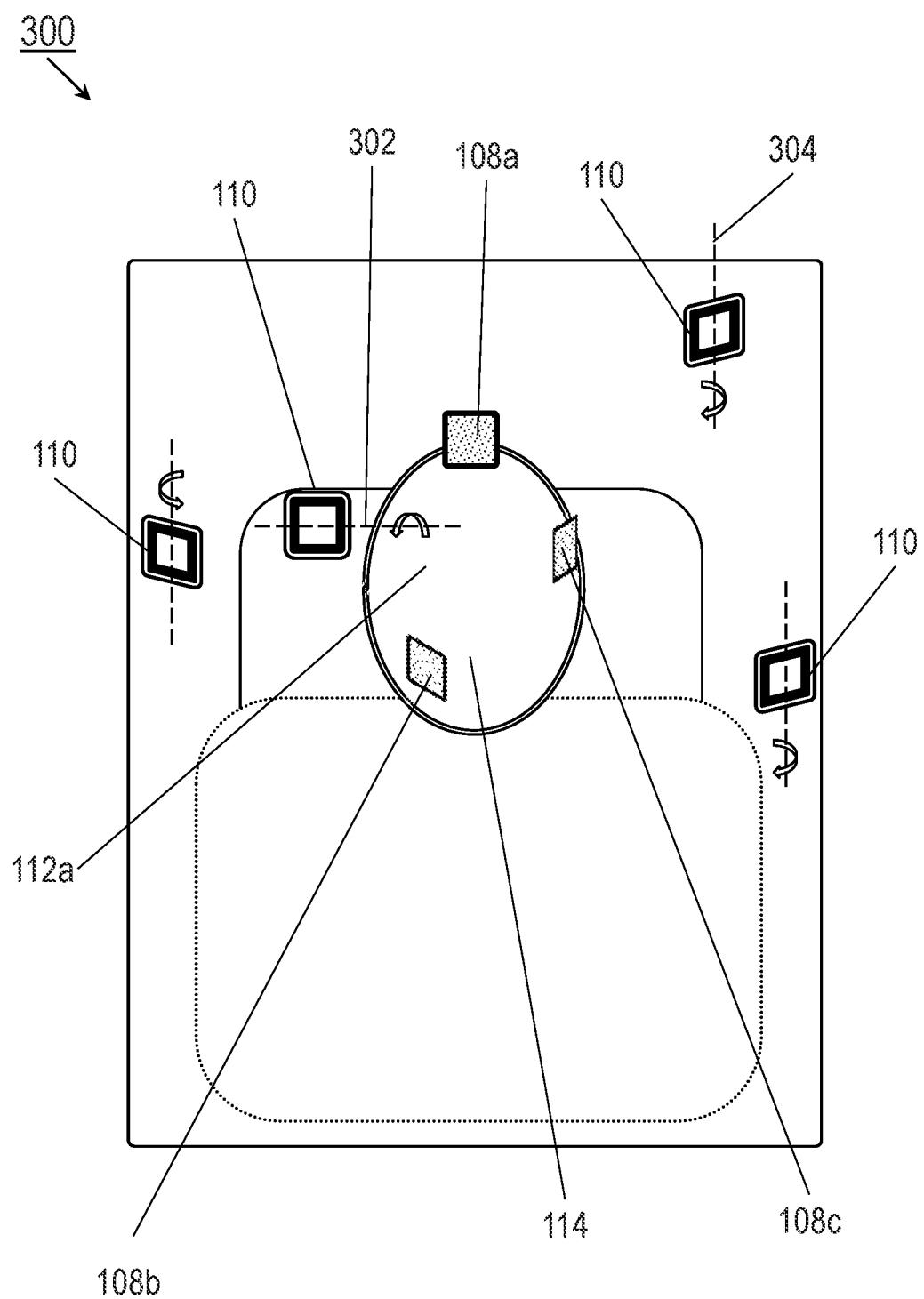
FIG. 3 is a diagrammatic overhead view of the headtracking system of FIG. 1.

Referring to FIG. 3, an image 300 of the cockpit (102, FIG. 1) as seen by the camera (104, FIG. 1) is disclosed.

In embodiments, the image 300 captured by the camera 104, mounted in the cockpit 102 and therefore fixed relative to the platform frame, may include one or more of the platform-frame static fiducial markers 110a-d, each of which may have a fixed position and orientation (e.g., pose) relative to the platform reference frame and known to the headtracker system 100 as described above. For example, the static fiducial marker 110a may be oriented parallel to the camera 104, or parallel to a pitch axis 302 (e.g., x-axis) of the aircraft. However, each of the static fiducial markers 110b-d may be mounted on an inclined or curved surface and may therefore be rotated with respect to one or more rotational axes (e.g., parallel to a yaw axis 304 (e.g., z-axis) of the aircraft).

Similarly, in embodiments the image 300 may include one or more device-frame fiducial markers 108a-c attached to the HWD 114. For example, each of the device-frame fiducial makers 108a-c may have a position and orientation relative to the platform reference frame, as seen by the camera 104.

In embodiments, when the HWD 114 (e.g., along with the head 112a) moves within, and relative to, the cockpit 102, the set of device-frame fiducial markers 108a-c attached to the HWD may collectively translate and/or rotate relative to the platform reference frame, and thus relative to the image 300 as seen by the camera 104. The translations and/or rotations of the respective device-frame fiducial markers (e.g., between successive frames of the image 300) may be detected by the translations of each device-frame fiducial marker relative to each of the platform-frame static fiducial markers 110, which remain fixed with respect to the platform reference frame. Accordingly, the device pose of the HWD 114 relative to the platform reference frame may be updated.

In embodiments, the headtracking system 100 may reference the known positions, orientations, and spatial extent of the platform-frame static fiducial markers 110 (e.g., as seen by the camera 104 in the image 300) to verify that any changes in device pose (e.g., between successive frames of the image 300) are accurate. For example, the relative positions of detected device-frame fiducial markers 108a-c (e.g., the distances and/or spatial extent of each device-frame fiducial marker from the camera 104) may be verified based on the known distances and/or spatial extent of proximate platform-frame static fiducial markers 110a-d. Similarly, the orientations of observed device-frame fiducial markers 108a-c may be verified based on the known rotational orientations of each platform-frame static fiducial marker 110.

Figure 4:
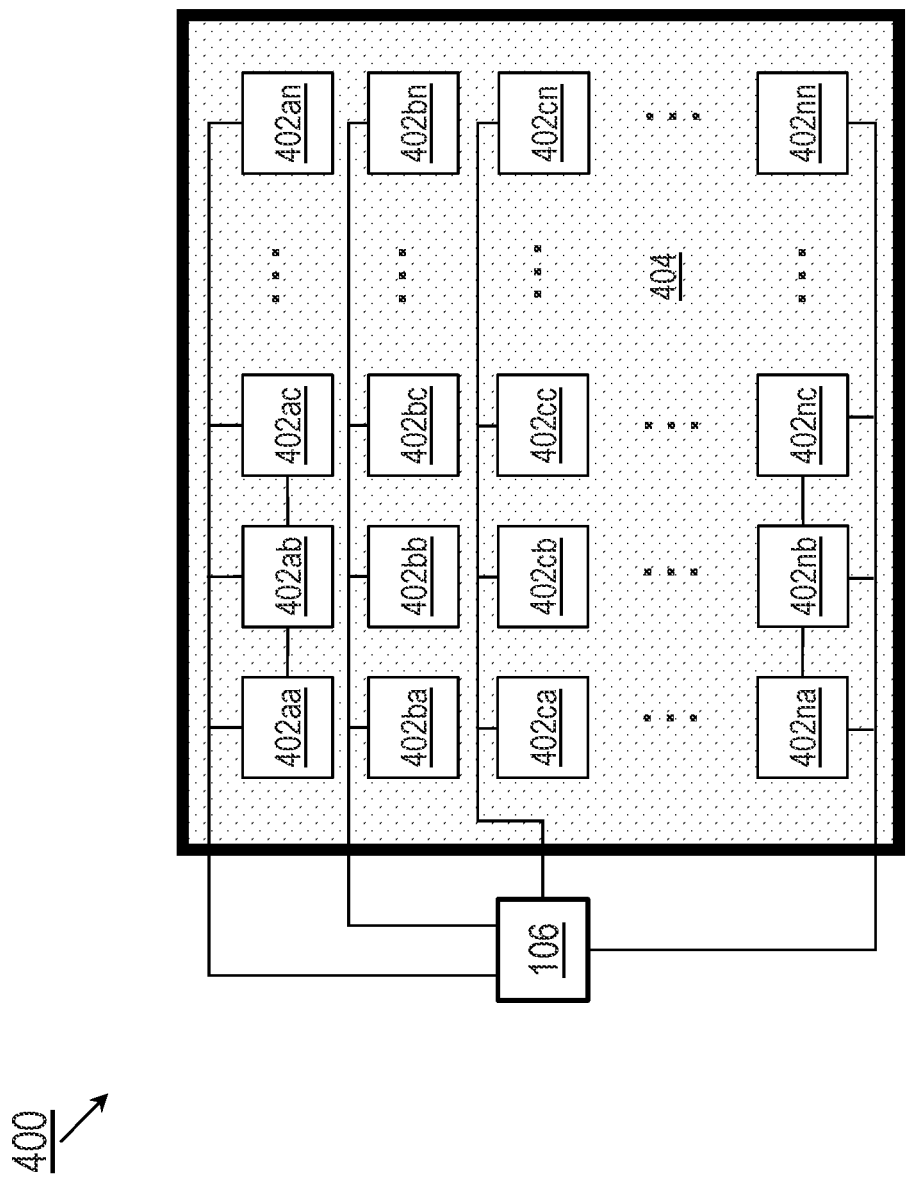
FIG. 4 is a diagrammatic illustration of a fiducial marker of the headtracking system of FIG. 1.

Referring to FIG. 4, the fiducial marker 400 may be implemented and may function similarly to the device-frame fiducial markers 108, 108a-c and the platform-frame static fiducial marker 110 of FIGS. 1 through 3, except that the dots of the fiducial marker 400 may include light-emitting diode (LED) units 402aa-402nn, reflectors, or any other similarly appropriate indicators capable of presenting a contrasting surface (e.g., white/black) to the marker background 404.

In embodiments, the fiducial marker 400 may be implemented as an M×M array of light-emitting diode units (LED) 402aa . . . 402an, 402na . . . 402nn. For example, the individual LED units 402aa-nn of the fiducial marker 400 may be individually programmed (e.g., via the control processors 106) for any desired M×M inner binary matrix (the on/off status of any given LED unit corresponding to a black/white or one/zero bit status). For example, the outermost perimeter of LED units 402aa-an, 402aa-na, 402an-nn, 402na-nn may be programmed for a "black" or "zero" state decodable as an outer border of the fiducial marker 400. In some embodiments, the dots 402aa-nn may be individually addressable or programmable LED units, such that the fiducial marker 400 may be programmed for any of a broad variety of dot constellations (202, FIG. 2A) within the outer border.

In some embodiments, the encoded marker 400 may incorporate any other appropriate means of storing and conveying encoded marker data, e.g., individual reflector units configured to present a variably reflective surface. For example, the LED units 402aa-nn may include pulse-width modulated (PWM) LED units controllable (e.g., via the control processors 106) along either a series of discrete brightness levels or a continuum from fully dimmed to fully brightened.

Figure 5A:
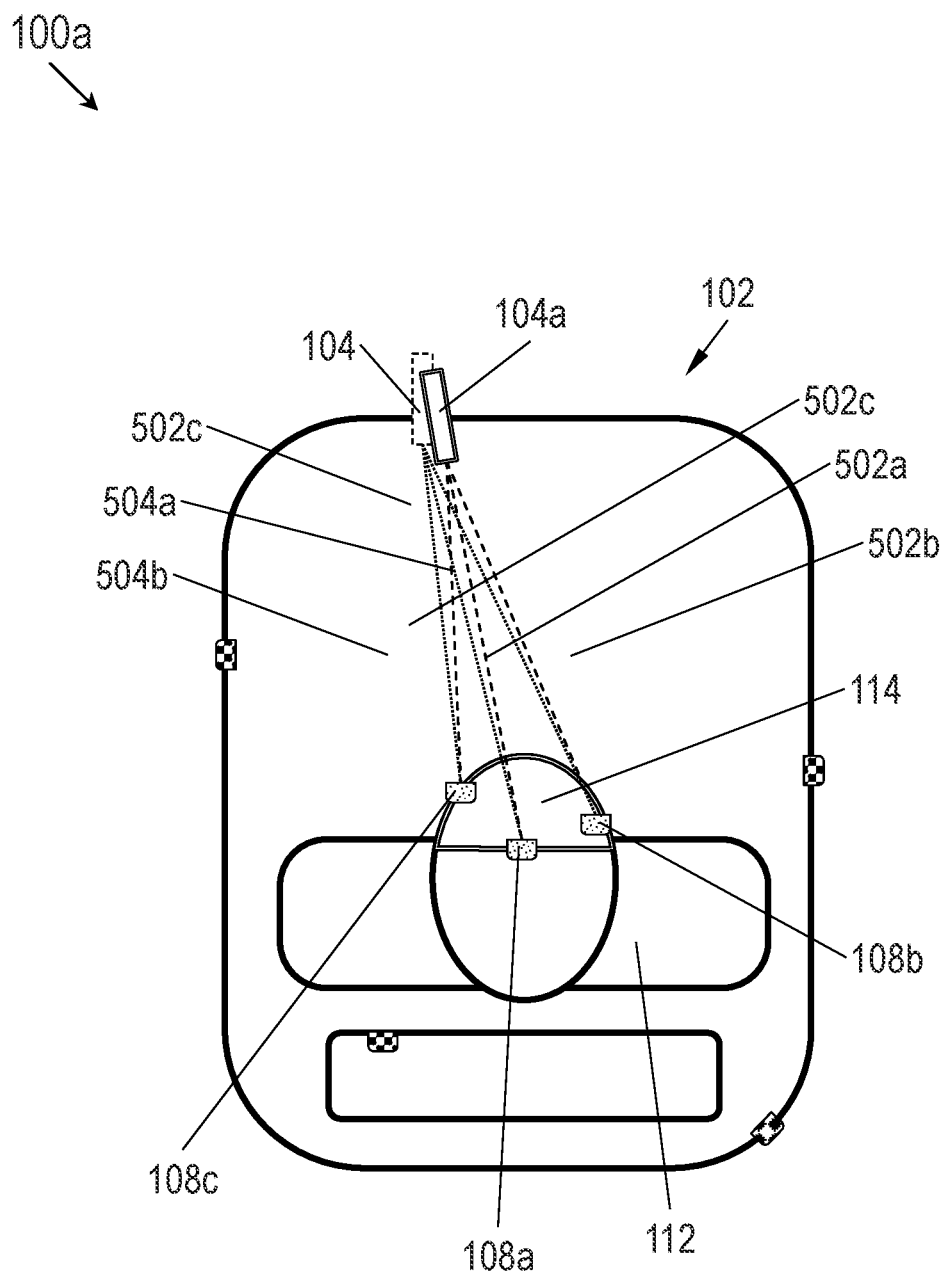
FIGS. 5A and 5B are diagrammatic overhead views of calibration operations of the headtracking system of FIG. 1.
Figure 5B:
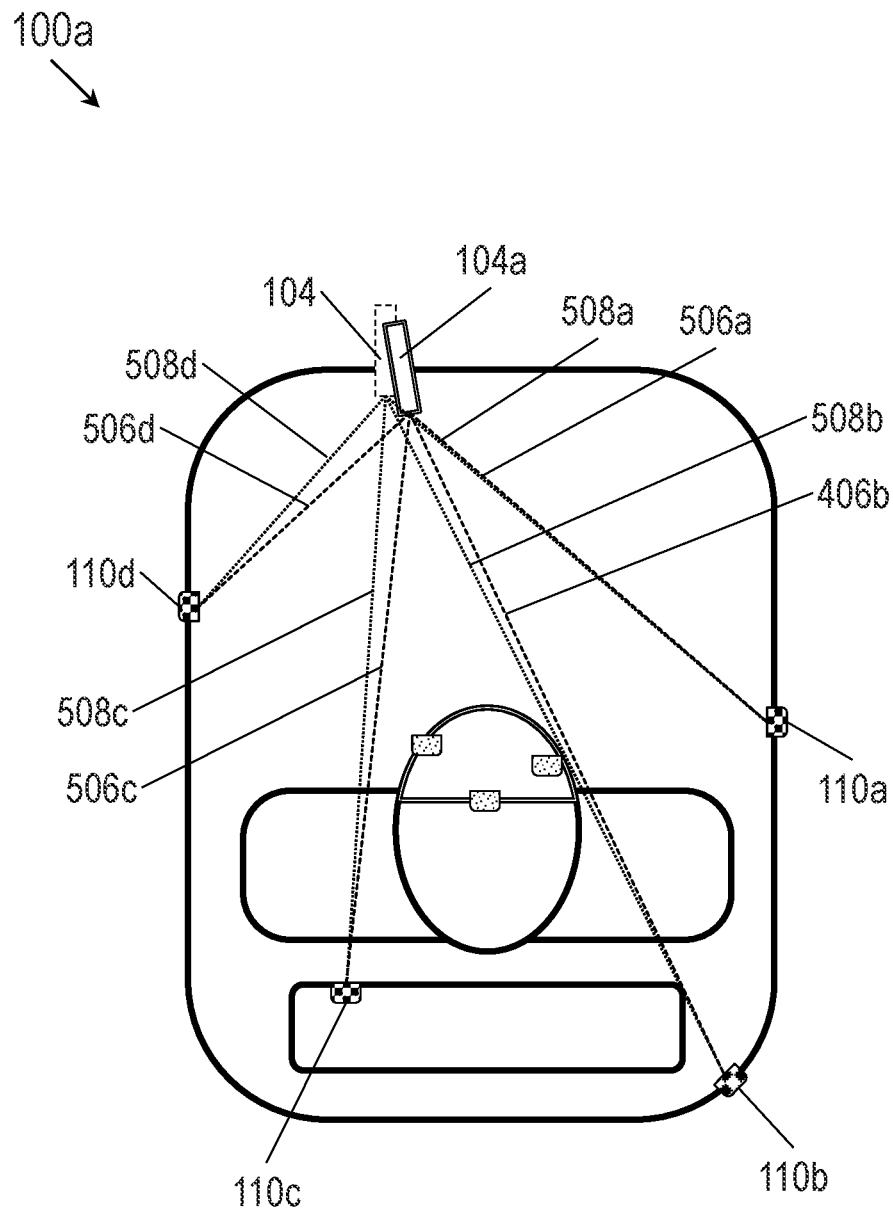

Referring to FIGS. 5A and 5B, the headtracker system 100a may be implemented and may function similarly to the headtracker system 100 of FIG. 1, except that the camera 104a of the headtracker system 100a may be misaligned from its proper position and/or orientation (104).

In embodiments, the camera 104a may be knocked loose from its mounting within the cockpit 102, or may otherwise become misaligned. For example, the misalignment may be so minor that the operation of the camera 104 is unaffected. However, while the ability of the camera 104a to capture images (300, FIG. 3) may be unimpeded, the position and orientation of each device-frame fiducial marker 108a-c as indicated by the images 300 may be based on a position and orientation (502a-c) of each device-frame fiducial marker different from its actual position and orientation of each device-frame fiducial marker (504a-c) relative to the proper position and orientation 104 of the camera 104a. In this way, the misalignment 104a of the camera may cascade to the headtracker system 100a and therefrom to any conformal information displayed to the pilot 112 via the HWD 114, with potentially deleterious consequences.

Referring in particular to FIG. 5B, in embodiments the platform-frame static fiducial markers 110a-d may be utilized to calibrate the camera 104 and detect any misalignment (104a) thereof. For example, images 300 captured by the misaligned camera 104a may indicate one or more platform-frame static fiducial markers 110a-d at positions or orientations (506a-d) inconsistent with their proper positions and orientations (508a-d) or spatial extents relative to the platform reference frame (e.g., where the platform-frame static fiducial markers should be, and how they should be proportioned, with respect to the images). Based on detected differences between the actual positions/orientations 506a-d and the intended or proper positions/orientations 508a-d of the platform-frame static fiducial markers 110a-d, camera misalignment 104a may be detected and the camera repositioned to its proper alignment (104) relative to the platform reference frame.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A head tracking system for a head worn display system, comprising:
    at least one camera mounted to a mobile platform, the camera configured to capture one or more images associated with a head-worn display (HWD) worn by an operator of the mobile platform;
    one or more sets of device-frame fiducial markers attached to the HWD;
    one or more platform-frame fiducial markers fixed to the mobile platform, each platform-frame fiducial marker corresponding to position information of at least one constellation of marker elements relative to a platform reference frame;
    the one or more sets of device-frame fiducial markers and the one or more platform-frame fiducial markers including one or more light-emitting diodes (LED);
    and
    one or more control processors in communication with the at least one camera, the one or more control processors configured to:
        identify within the captured images at least one of 1) the one or more sets of device-frame fiducial markers or 2) the one or more platform-frame fiducial markers;
        determine at least one initial device pose based on the one or more identified sets of device-frame fiducial markers, the initial device pose comprising a position of the HWD and an orientation of the HWD relative to the platform reference frame;
        and
        monitor the at least one initial device pose based on the position information corresponding to the one or more identified platform-frame fiducial markers.

2. The head tracking system of claim 1, wherein the one or more sets of device-frame fiducial markers and the one or more platform-frame fiducial markers include at least one reflective marker element.

3. The head tracking system of claim 1, wherein the control processors are configured to revise the at least one initial device pose based on the position information corresponding to the one or more identified constellations.

4. The head-tracking system of claim 1, wherein the one or more LEDs include at least one constellation of individually addressable LEDs.

5. The head-tracking system of claim 1, wherein the one or more LEDs include one or more pulse-width modulated (PWM) LEDs configured for programming at one or more brightness levels by the one or more control processors.

6. The head tracking system of claim 1, wherein one or more sets of device-frame fiducial markers and the one or more platform-frame fiducial markers corresponds to at least one set of unique encoded identifiers.

7. The head-tracking system of claim 6, wherein the one or more control processors are configured to encode the least one constellation of marker elements according to the at least one set of unique encoded identifiers.

8. The head-tracking system of claim 7, wherein the at least one unique encoded identifier is associated with at least one of:
   a marker orientation;
   or
   a marker spatial extent.

9. The head tracking system of claim 1, wherein:
   the at least one camera corresponds to an alignment of the camera relative to the platform reference frame;
   and
   the one or more control processors are configured to monitor the alignment of the camera pose based on the position information corresponding to the one or more identified platform-frame fiducial markers.

10. The head tracking system of claim 9, wherein:
    the one or more control processors are configured to detect a misalignment of the camera based on the position information corresponding to the one or more identified platform-frame fiducial markers.

11. A high-assurance head tracking system for a head worn display system, comprising:
    at least one camera mounted to a mobile platform, the camera configured to capture one or more images associated with a head-worn display (HWD) worn by an operator of the mobile platform;
    one or more sets of device-frame fiducial markers attached to the HWD;
    one or more platform-frame fiducial markers fixed to the mobile platform, each platform-frame fiducial marker corresponding to position information of at least one constellation of marker elements relative to a platform reference frame;
    one or more structured light sensors mountable in a mobile platform in a fixed orientation toward the operator, the one or more structured light sensors configured to:
       project at least one structured light pattern onto the operator;
       and
       capture three-dimensional (3D) imagery associated with 1) the at least one structured light pattern; 2) a head of the operator; 3) the one or more platform-frame fiducial markers and 4) at least one device-frame fiducial marker of the one or more sets of device-frame fiducial markers;
    one or more control processors in communication with the at least one camera, the one or more control processors configured to:
       identify within the captured images at least one of 1) the one or more sets of device-frame fiducial markers or 2) the one or more platform-frame fiducial markers;
       determine at least one initial device pose based on the one or more identified sets of device-frame fiducial markers, the initial device pose comprising a position of the HWD and an orientation of the HWD relative to the platform reference frame;
       determine, based on the captured 3D imagery and at least one secondary marker location associated with the at least one device-frame fiducial marker, at least one head pose of the operator, the head pose comprising a position and an orientation of the head relative to the mobile platform;
       verify the at least one head pose based on the position information corresponding to the one or more platform-frame fiducial markers associated with the captured 3D imagery;
       and
       correct the at least one initial device pose based on the at least one verified head pose.

12. The high-assurance head tracking system of claim 11, wherein:
    the one or more platform-frame fiducial markers include one or more 3D fiducial markers;
    and
    the known marker location of each 3D fiducial marker includes a known orientation of the 3D fiducial marker relative to the mobile platform.

13. The high-assurance head tracking system of claim 11, wherein:
    the at least one device-frame fiducial marker includes one or more three-dimensional (3D) fiducial markers;
    and
    each secondary marker location includes an orientation of the associated device-frame fiducial marker relative to the mobile platform.

14. The high-assurance head tracking system of claim 11, wherein:
    the at least one projected pattern includes at least one high density portion corresponding to a likely location of the head.

15. The high-assurance head tracking system of claim 11, wherein:
    the mobile platform is an aircraft having a cockpit;
    the occupant is a pilot of the aircraft seated within the cockpit;
    the at least one structured light sensor is fixed within the cockpit;
    and
    the at least one projected pattern contours or conforms to at least one interior surface of the cockpit.

16. The high-assurance head tracking system of claim 15, wherein the at least one structured light sensor is mounted behind the pilot.

17. The high-assurance head tracking system of claim 11, further comprising:
    at least one memory communicatively coupled to the one or more control processors, the at least one memory configured to store one or more head models;
    wherein
    the control processors are configured to determine one or more of the position or the orientation of the head by comparing the captured 3D imagery to the one or more head models.

* * * * *